US012618365B2

(12) United States Patent
Kelsey

(10) Patent No.: US 12,618,365 B2
(45) Date of Patent: May 5, 2026

(54) BIDIRECTIONAL PUMP FOR THERMAL MANAGEMENT SYSTEMS

(71) Applicant: RTX Corporation, Farmington, CT (US)

(72) Inventor: Christine Kelsey, East Hampton, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/792,855

(22) Filed: Aug. 2, 2024

(65) Prior Publication Data

US 2026/0036085 A1 Feb. 5, 2026

(51) Int. Cl.
*F02C 7/14* (2006.01)
*F02C 7/06* (2006.01)
*F02C 9/18* (2006.01)

(52) U.S. Cl.
CPC ................. *F02C 7/14* (2013.01); *F02C 7/06* (2013.01); *F02C 9/18* (2013.01); *F05D 2220/323* (2013.01); *F05D 2260/213* (2013.01)

(58) Field of Classification Search
CPC ...... F02C 7/14; F02C 7/06; F02C 9/18; F05D 2220/323; F05D 2260/213
See application file for complete search history.

(56) References Cited

U.S. PATENT DOCUMENTS 3,902,318 A 9/1975 Becker et al.
3,928,968 A 12/1975 Becker et al.

5,615,547 A 4/1997 Beutin et al.
6,149,410 A 11/2000 Cooper
2010/0107603 A1* 5/2010 Smith ...................... F02C 7/224
                                                                    701/100
2021/0148283 A1* 5/2021 Niergarth ................ F02C 7/185
2022/0195925 A1 6/2022 Rambo

FOREIGN PATENT DOCUMENTS

WO 2021089917 A1 5/2021

OTHER PUBLICATIONS

Extended European Search Report for counterpart EP Application No. 25191578.1 dated Jan. 2, 2026.

* cited by examiner

*Primary Examiner* — Rodolphe Andre Chabreyrie
(74) *Attorney, Agent, or Firm* — Bachman & LaPointe, P.C.

(57) ABSTRACT

A bidirectional pump for a thermal management system including a working fluid fluidly coupled with the bidirectional pump; a bypass air heat exchanger fluidly coupled with the bidirectional pump through the working fluid; an auxiliary heat exchanger fluidly coupled with the bidirectional pump and the bypass air heat exchanger through the working fluid; a fuel heat exchanger fluidly coupled with the bidirectional pump and the auxiliary heat exchanger through the working fluid, wherein the bidirectional pump is configured to pump the working fluid through each of the bypass air heat exchanger, the auxiliary heat exchanger and the fuel heat exchanger in at least one of a first flow direction and a second flow direction.

20 Claims, 3 Drawing Sheets

BIDIRECTIONAL PUMP FOR THERMAL MANAGEMENT SYSTEMS

BACKGROUND

The present disclosure is directed to a bidirectional pump for a thermal management system.

Engine thermal management sinks transfer heat from different fluids to keep certain areas cool, such as the oil system. The fluid being cooled is often compressor bleed air or oil. In certain areas of the flight envelope, it is ideal to sink heat to bypass air, while in other areas of the envelope, it is better to sink heat to fuel. Air temperature, fuel temperature, air mass flow, fuel mass flow, and the like affects how efficient either the bypass air or fuel performs transferring heat.

Currently solutions include an engine having several heat exchangers. Some systems use bypass air as a heat sink for cooling. Others use fuel as a heat sink for cooling. Some systems have both a bypass air heat exchanger and a fuel heat exchanger.

SUMMARY

In accordance with the present disclosure, there is provided a bidirectional pump for a thermal management system comprising a working fluid fluidly coupled with the bidirectional pump; a bypass air heat exchanger fluidly coupled with the bidirectional pump through the working fluid; an auxiliary heat exchanger fluidly coupled with the bidirectional pump and the bypass air heat exchanger through the working fluid; and a fuel heat exchanger fluidly coupled with the bidirectional pump and the auxiliary heat exchanger through the working fluid, wherein the bidirectional pump is configured to pump the working fluid through each of the bypass air heat exchanger, the auxiliary heat exchanger and the fuel heat exchanger in at least one of a first flow direction and a second flow direction.

A further embodiment of any of the foregoing embodiments may additionally and/or alternatively include the first flow direction comprises flowing the working fluid from the bidirectional pump to the bypass air heat exchanger and then to the auxiliary heat exchanger and then to the fuel heat exchanger and return the working fluid from the fuel heat exchanger to the bidirectional pump in series.

A further embodiment of any of the foregoing embodiments may additionally and/or alternatively include the second flow direction comprises flowing the working fluid from the bidirectional pump to the fuel heat exchanger and then to the auxiliary heat exchanger and then to the bypass air heat exchanger and return the working fluid from the bypass air heat exchanger to the bidirectional pump in series.

A further embodiment of any of the foregoing embodiments may additionally and/or alternatively include the bypass air heat exchanger comprises a bypass air side and a working fluid side; the bypass air heat exchanger configured to transfer thermal energy between bypass air and the working fluid.

A further embodiment of any of the foregoing embodiments may additionally and/or alternatively include the auxiliary heat exchanger comprises an auxiliary fluid side and a working fluid side, the auxiliary heat exchanger configured to transfer thermal energy between an auxiliary fluid and the working fluid.

A further embodiment of any of the foregoing embodiments may additionally and/or alternatively include the fuel heat exchanger comprises a fuel side and a working fluid side, the fuel heat exchanger configured to transfer thermal energy between a fuel and the working fluid.

A further embodiment of any of the foregoing embodiments may additionally and/or alternatively include the bidirectional pump for a thermal management system further comprising a controller in operative communication with the bidirectional pump; wherein the controller is configured to operate the bidirectional pump in one of the first flow direction or the second flow direction responsive to a gas turbine engine operational condition and flight envelope.

In accordance with the present disclosure, there is provided a bidirectional pump for a thermal management system in a gas turbine engine comprising bypass air duct configured to flow a bypass air flow; a fuel system configured to supply fuel to a combustor; a lubrication oil system configured to supply lubrication oil to components in the gas turbine engine; a compressor bleed air system configured to supply compressor bleed air to components; a working fluid fluidly coupled with the bidirectional pump; a bypass air heat exchanger fluidly coupled with the bidirectional pump through the working fluid, wherein the bypass air heat exchanger includes the bypass air thermally coupled with the working fluid; an auxiliary heat exchanger fluidly coupled with the bidirectional pump and the bypass air heat exchanger through the working fluid, wherein the auxiliary heat exchanger includes the auxiliary fluid thermally coupled with the working fluid; and a fuel heat exchanger fluidly coupled with the bidirectional pump and the auxiliary heat exchanger through the working fluid, wherein the fuel heat exchanger includes the fuel thermally coupled with the working fluid; wherein the bidirectional pump is configured to pump the working fluid through each of the bypass air heat exchanger, the auxiliary heat exchanger and the fuel heat exchanger in at least one of a first flow direction and a second flow direction.

A further embodiment of any of the foregoing embodiments may additionally and/or alternatively include the first flow direction comprises flowing the working fluid from the bidirectional pump to the bypass air heat exchanger and then to the auxiliary heat exchanger and then to the fuel heat exchanger and return the working fluid from the fuel heat exchanger to the bidirectional pump in series.

A further embodiment of any of the foregoing embodiments may additionally and/or alternatively include the second flow direction comprises flowing the working fluid from the bidirectional pump to the fuel heat exchanger and then to the auxiliary heat exchanger and then to the bypass air heat exchanger and return the working fluid from the bypass air heat exchanger to the bidirectional pump in series.

A further embodiment of any of the foregoing embodiments may additionally and/or alternatively include the bypass air heat exchanger comprises a bypass air side and a working fluid side; the bypass air heat exchanger configured to transfer thermal energy between bypass air and the working fluid.

A further embodiment of any of the foregoing embodiments may additionally and/or alternatively include the auxiliary heat exchanger comprises an auxiliary fluid side and a working fluid side, the auxiliary heat exchanger configured to transfer thermal energy between an auxiliary fluid and the working fluid.

A further embodiment of any of the foregoing embodiments may additionally and/or alternatively include the fuel heat exchanger comprises a fuel side and a working fluid side, the fuel heat exchanger configured to transfer thermal energy between a fuel and the working fluid.

In accordance with the present disclosure, there is provided a process for thermal management system having a bidirectional pump in a gas turbine engine comprising configuring a bypass air duct to flow a bypass air flow; configuring a fuel system to supply fuel to a combustor; configuring a lubrication oil system to supply lubrication oil to components in the gas turbine engine; configuring a compressor bleed air system to supply compressor bleed air to components; fluidly coupling a working fluid with the bidirectional pump; fluidly coupling a bypass air heat exchanger with the bidirectional pump through the working fluid; thermally coupling the bypass air with the working fluid; fluidly coupling an auxiliary heat exchanger with the bidirectional pump and the bypass air heat exchanger through the working fluid; thermally coupling the auxiliary fluid with the working fluid; fluidly coupling a fuel heat exchanger with the bidirectional pump and the auxiliary heat exchanger through the working fluid, thermally coupling the fuel with the working fluid; and configuring the bidirectional pump to pump the working fluid through each of the bypass air heat exchanger, the auxiliary heat exchanger and the fuel heat exchanger in at least one of a first flow direction and a second flow direction.

A further embodiment of any of the foregoing embodiments may additionally and/or alternatively include the process further comprising flowing the working fluid from the bidirectional pump to the bypass air heat exchanger and then to the auxiliary heat exchanger and then to the fuel heat exchanger and return the working fluid from the fuel heat exchanger to the bidirectional pump in series, as the first flow direction.

A further embodiment of any of the foregoing embodiments may additionally and/or alternatively include the process further comprising flowing the working fluid from the bidirectional pump to the fuel heat exchanger and then to the auxiliary heat exchanger and then to the bypass air heat exchanger and return the working fluid from the bypass air heat exchanger to the bidirectional pump in series, as the second flow direction.

A further embodiment of any of the foregoing embodiments may additionally and/or alternatively include the bypass air heat exchanger comprises a bypass air side and a working fluid side; and configuring the bypass air heat exchanger to transfer thermal energy between bypass air and the working fluid.

A further embodiment of any of the foregoing embodiments may additionally and/or alternatively include the auxiliary heat exchanger comprises an auxiliary fluid side and a working fluid side; and configuring the auxiliary heat exchanger to transfer thermal energy between an auxiliary fluid and the working fluid.

A further embodiment of any of the foregoing embodiments may additionally and/or alternatively include the fuel heat exchanger comprises a fuel side and a working fluid side; and configuring the fuel heat exchanger to transfer thermal energy between a fuel and the working fluid.

A further embodiment of any of the foregoing embodiments may additionally and/or alternatively include the process further comprising coupling a controller in operative communication with the bidirectional pump; and configuring the controller to operate the bidirectional pump in one of the first flow direction or the second flow direction responsive to a gas turbine engine operational condition and flight envelope.

Other details of the bidirectional pump for a thermal management system are set forth in the following detailed description and the accompanying drawings wherein like reference numerals depict like elements.

DETAILED DESCRIPTION

Figure 1:
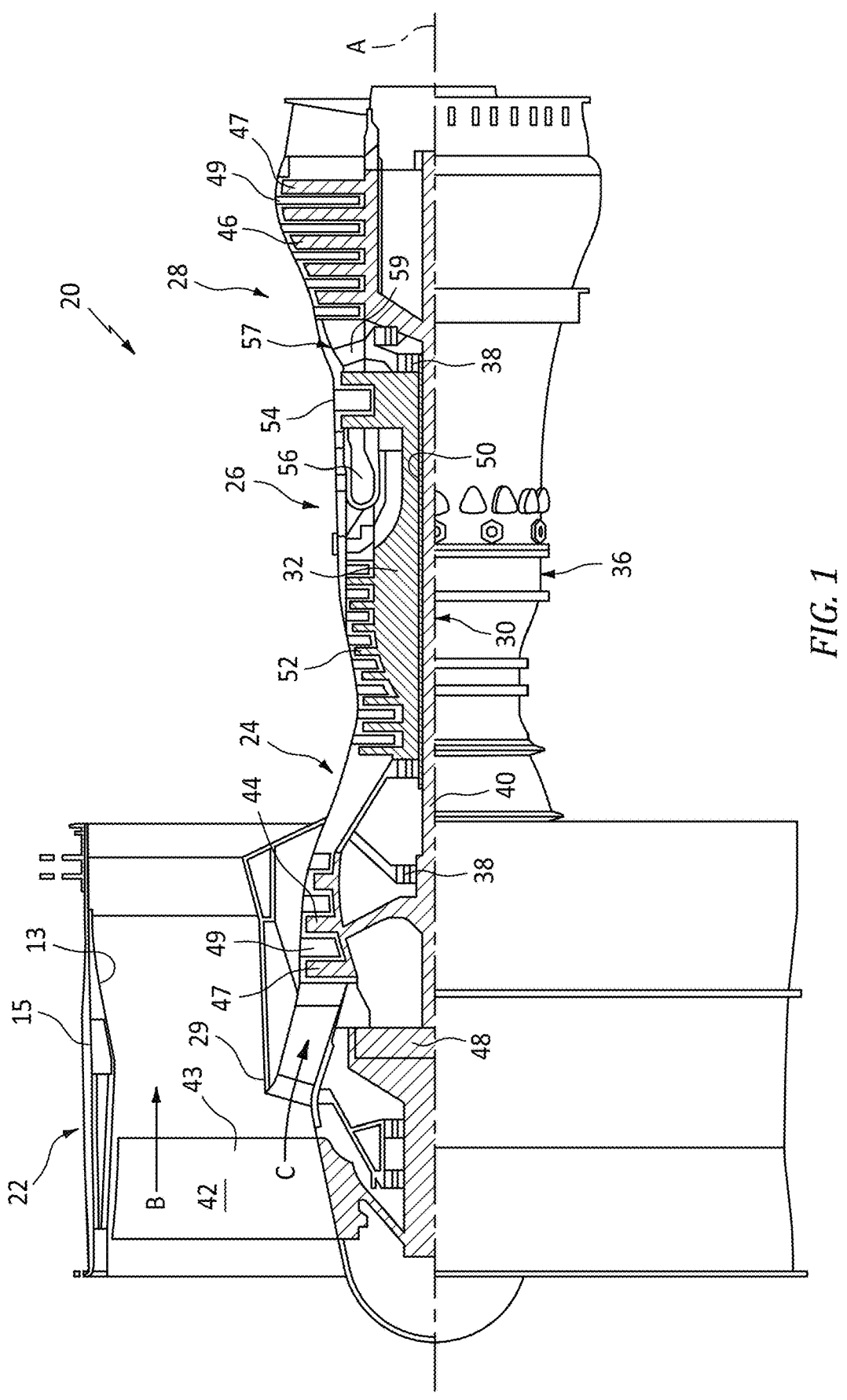
FIG. 1 is a cross section view of an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

Figure 2:
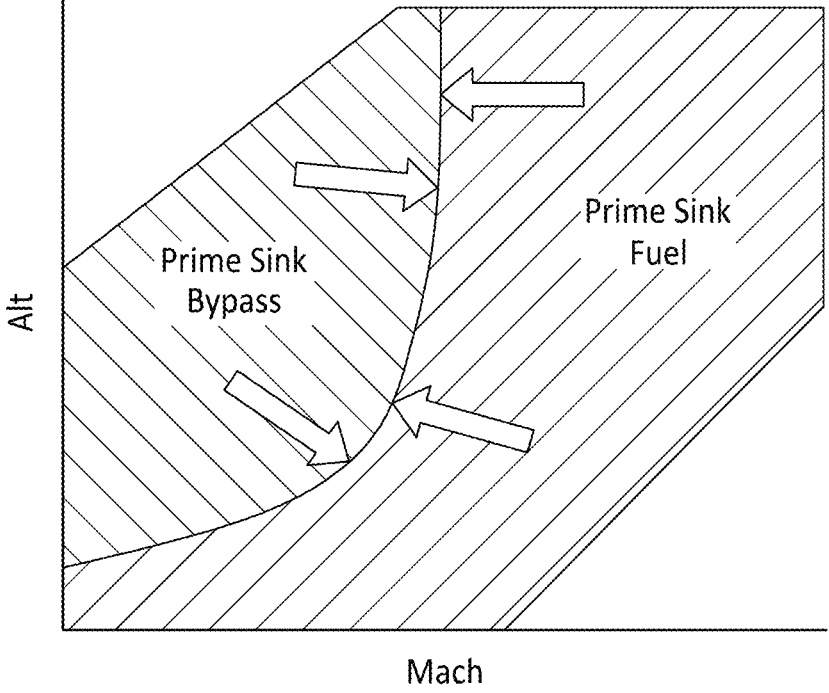
FIG. 2 is a schematic representation of the relationship between heat sinks and flight envelope.

FIG. 2. illustrates the relationship of the heat sinks with the heat sources depending on the flight envelope conditions. The flight envelope, also known as a performance envelope, refers to the design capabilities of the aircraft. During various phases of flight, such as takeoff, climb, cruise, and landing, the aircraft goes through varying thermal loads. The altitude of the engine is on the Y-axis and the air speed (MACH) is on the X-axis. One of the prime heat sinks is shown as the Bypass airstream flowing though the Bypass duct and the other prime heat sink is shown as the fuel.

Figure 3:
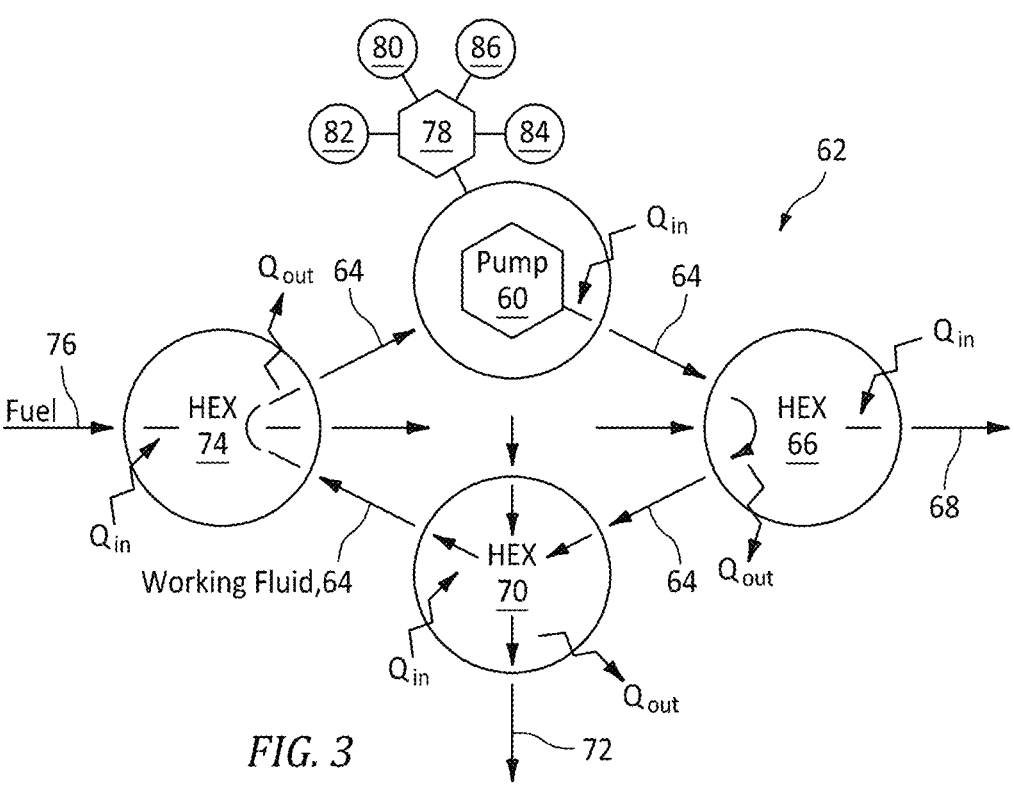
FIG. 3 is a schematic representation of an exemplary bidirectional pump for thermal management systems.

Referring also to FIG. 3 the schematic diagram shows a bidirectional pump 60 in operative communication with thermal management system 62. The bidirectional pump 60 is fluidly coupled with a working fluid 64. For example the working fluid 64 can be Polyalphaolefin (PAO), and the like. The working fluid 62 can circulate through a closed loop within the thermal management system 62 and return to the bidirectional pump 60. In an exemplary embodiment, the working fluid 64 is shown as circulating in a clockwise direction. The working fluid 64 discharges from the bidirectional pump 60 to a bypass air heat exchanger 66. The bypass air heat exchanger 66 passes the working fluid 64 on one side and bypass air 68 on the other side of the bypass air heat exchanger 66. The bypass air heat exchanger 66 can be configured in a variety of heat exchanger designs, shell and tube, parallel heat exchangers, and the like, depending on the location and structural requirements. The bypass air 68 can be atmospheric air flowing through components, such as the bypass duct or air directly taken from an air scoop at an exterior or the engine 20 or aircraft. The bypass air 68 flowing into the bypass air heat exchanger 66 is relatively cooler than the working fluid 64. Thermal energy Q is transferred from the working fluid 64 into the bypass air 68. The bypass air 68 exits the bypass air heat exchanger 66 warmer than when the bypass air entered the bypass air heat exchanger 66. The working fluid 64 exits the bypass air heat exchanger 66 cooler than entering the bypass air heat exchanger 66. The bypass air 68 is thermally coupled with the working fluid 64 in the bypass air heat exchanger 66.

The working fluid 64 is shown exiting the bypass air heat exchanger 66 and being fluidly coupled in series with an auxiliary heat exchanger 70. The working fluid 64 flows through the auxiliary heat exchanger 70 and an auxiliary fluid 72 also flows through the auxiliary heat exchanger 70. The auxiliary fluid 72 can be a lubrication oil, a compressor bleed air, an aircraft coolant, aircraft fluids (e.g.; electronics coolant), such as PAO and the like. The compressor bleed air can be provided to the gas turbine engine 20 and/or components, such as aircraft systems, like an environmental control system. In this example, the auxiliary fluid 72 is relatively warmer than the working fluid 64. As the auxiliary fluid 72 passes through the auxiliary heat exchanger 70 thermal energy can be transferred into the relatively cooler working fluid 64. The auxiliary fluid 72 can discharge from the auxiliary heat exchanger 70 having been cooled. The working fluid 64 can discharge the auxiliary heat exchanger 70 having been heated. The auxiliary fluid 72 is thermally coupled with the working fluid 64 in the auxiliary heat exchanger 70.

The working fluid 64 can exit the auxiliary heat exchanger 70 and be fluidly coupled with a fuel heat exchanger 74. The working fluid 64 flows on one side of the fuel heat exchanger 74 and fuel 76 flows on the other side of the fuel heat exchanger 74. The fuel 72 can be supplied from the fuel system at various locations along the fuel system. In this example, the fuel 76 is relatively cooler than the working fluid 64. As the fuel 76 passes through the fuel heat exchanger 74 thermal energy can be transferred from the relatively warmer working fluid 64. The fuel 76 can discharge from the fuel heat exchanger 74 having been heated. The working fluid 64 can discharge the fuel heat exchanger 74 having been cooled. The fuel 76 is thermally coupled with the working fluid 64 in the fuel heat exchanger 74.

The working fluid 64 can discharge from the fuel heat exchanger 74 and return to the bidirectional pump 60. The bidirectional pump 60 can transfer a predetermined quantity of thermal energy into the working fluid 64.

In the thermal management system 62 loop shown at FIG. 3, most of the heat is likely dumped to the fuel 76 because the largest temperature difference is probably there. However, the temperature of the bypass air 68 and the mass flows of all the fluids could result in larger heat transfer at the bypass air heat exchanger 66.

Figure 4:
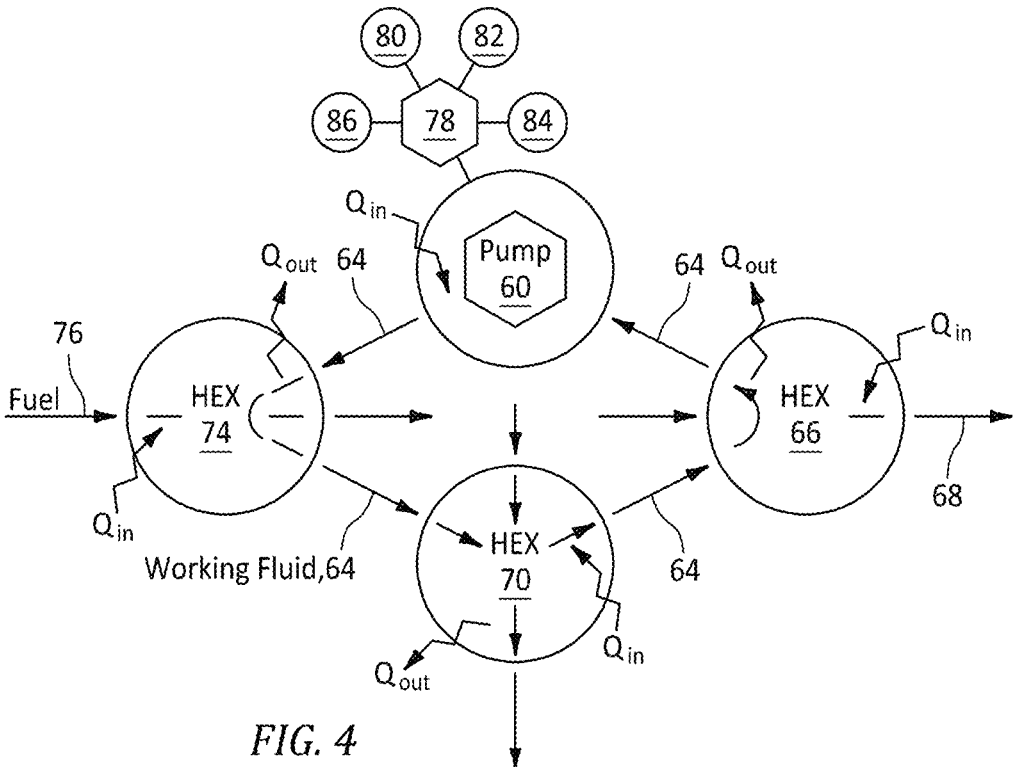
FIG. 4 is a schematic representation of an exemplary bidirectional pump for thermal management systems.

Referring also to FIG. 4, the schematic diagram shows a bidirectional pump 60 in operative communication with thermal management system 62. In this illustration, the flow of the working fluid 64 is changed to a counterclockwise direction. The bidirectional pump 60 is configured to reverse the flow direction.

The working fluid 64 can discharge from the bidirectional pump 60 and flow to the fuel heat exchanger 74. The bidirectional pump 60 can transfer a predetermined quantity of thermal energy into the working fluid 64.

The working fluid 64 can exit the bidirectional pump 60 and be fluidly coupled with the fuel heat exchanger 74. The working fluid 64 flows on one side of the fuel heat exchanger 74 and the fuel 76 flows on the other side of the fuel heat exchanger 74. The fuel 72 can be supplied from the fuel system at various locations along the fuel system. In this example, the fuel 76 is relatively cooler than the working fluid 64. As the fuel 76 passes through the fuel heat exchanger 74 thermal energy can be transferred from the relatively warmer working fluid 64. The fuel 76 can discharge from the fuel heat exchanger 74 having been heated. The working fluid 64 can discharge the fuel heat exchanger 74 having been cooled. In an alternative embodiment, the fuel 76 can be warmer than the working fluid 64 and thermal energy can instead, transfer from the fuel 76 into the working fluid 64.

The working fluid 64 is shown exiting the fuel heat exchanger 74 and being fluidly coupled in series with the auxiliary heat exchanger 70. In this example, the auxiliary fluid 72 is relatively warmer than the working fluid 64. As the auxiliary fluid 72 passes through the auxiliary heat exchanger 70 thermal energy can be transferred into the relatively cooler working fluid 64. The auxiliary fluid 72 can discharge from the auxiliary heat exchanger 70 having been cooled. The working fluid 64 can discharge the auxiliary heat exchanger 70 having been heated.

The working fluid 64 discharges from the auxiliary heat exchanger 70 to the bypass air heat exchanger 66. The bypass air 68 flowing into the bypass air heat exchanger 66 is relatively cooler than the working fluid 64. Thermal energy Q is transferred from the working fluid 64 into the bypass air 68. The bypass air 68 exits the bypass air heat exchanger 66 having been heated. The working fluid 64 exits the bypass air heat exchanger 66 having been cooled.

The working fluid 64 returns to the bidirectional pump 60 from the bypass air heat exchanger 66. In the loop shown at FIG. 4, most of the heat is likely dumped to the bypass air 68 because the largest temperature difference is probably there. However, the temperature of the fuel 76 and the mass flows of all the fluids could result in larger heat transfer at the fuel heat exchanger 74. There are also times when the fuel 76 temperature may be higher than working fluid 64 in the fuel heat exchanger 74.

The bidirectional pump 60 can be controlled by a control system 78 to optimally choose where most of the system heat gets dumped by changing the direction of the working fluid 64 flow and/or varying the mass flow rate of the working fluid 64 through the thermal management system 62. When the thermal management system 62 is configured to using either only bypass air 68 or fuel 76, then the heat exchangers must be large in order to get the required cooling in areas of the envelope where bypass air 68 properties or fuel 76 properties are not ideal for heat transfer. By putting the bypass air 68 and the fuel 76 on the same thermal management system 62 circuit, the heat exchanger 66, 70, 74 sizes can be reduced. Reducing volume saves weight. The exemplary embodiments shown in FIG. 3 and FIG. 4 show the bidirectional pump 60 located in series between the fuel heat exchanger 74 and the bypass air heat exchanger 66. It is contemplated that the bidirectional pump 60 can be located in different locations relative to the heat exchangers 66, 70 and 74. For example, although not shown, the bidirectional pump 60 can be located between the bypass air heat exchanger 66 and the auxiliary heat exchanger 70. For example, although not shown, the bidirectional pump 60 can be located between the auxiliary heat exchanger 70 and the fuel heat exchanger 74.

The control system 78 may include hardware, firmware, and/or software components that are configured to perform the functions disclosed herein, including the functions of the thermal management system 62. While not specifically shown, the control system 78 may include other computing devices (e.g., servers, mobile computing devices, etc.) and computer aided manufacturer (CAM) systems which may be in communication with each other and/or the control system 78 via a communication network 80 to perform one or more of the disclosed functions. The control system 78 may include at least one processor 82 (e.g., a controller, microprocessor, microcontroller, digital signal processor, etc.), memory 84, and an input/output (I/O) subsystem 86. The control system 78 may be embodied as any type of computing device e.g., a server, an enterprise computer system, a network of computers, a combination of computers and other electronic devices, or other electronic devices. Although not specifically shown, the I/O subsystem 86 typically includes, for example, an I/O controller, a memory controller, and one or more I/O ports. The processor 82 and the I/O subsystem 86 are communicatively coupled to the memory 84. The memory 84 may be embodied as any type of computer memory device (e.g., volatile memory such as various forms of random access memory.

A technical advantage of the disclosed bidirectional pump for a thermal management system includes employing a bidirectional pump to change the direction of the heat exchanger fluid flow to use the optimal cooling order under the engine's circumstances.

Another technical advantage of the disclosed bidirectional pump for a thermal management system includes the capacity to select where thermal energy goes to increase thrust specific fuel consumption. There is a benefit to heating the fuel prior to combustion for better thrust specific fuel consumption.

Another technical advantage of the disclosed bidirectional pump for a thermal management system includes controlling the direction and speed of the bidirectional pump in order to assist the engine in achieving an optimal fuel temperature at the fuel nozzles for the best thrust specific fuel consumption at flight conditions.

Another technical advantage of the disclosed bidirectional pump for a thermal management system includes the flexibility to employ either/both bypass air and fuel to achieve cooling with a bidirectional system allowing for flexibility with the heat exchanger order after it has been designed.

Another technical advantage of the disclosed bidirectional pump for a thermal management system includes avoiding the need for plumbing and valves to bypass a heat exchanger to avoid dumping unnecessary heat to fuel, for example, but the additional plumbing and valves are a weight, cost, and volume penalty on the engine.

Another technical advantage of the disclosed bidirectional pump for a thermal management system includes the ability to control the bidirectional pump speed to achieve optimal heat transfer for the given components. For example, in areas of the flight envelope where the fuel system heat loads are challenged, the working fluid mass flow can be set to achieve the minimum required cooling for auxiliary fluid, given bypass air temperatures, but not dump unneeded heat into the fuel.

There has been disclosed a bidirectional pump for a thermal management system. While the bidirectional pump for a thermal management system has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A thermal management system, having a bidirectional pump, the thermal management system comprising:

a working fluid fluidly coupled with the bidirectional pump;

a bypass air heat exchanger fluidly coupled with the bidirectional pump through the working fluid;

an auxiliary heat exchanger fluidly coupled with the bidirectional pump and the bypass air heat exchanger through the working fluid; and a fuel heat exchanger fluidly coupled with the bidirectional pump and the auxiliary heat exchanger through the working fluid, wherein the bidirectional pump pumps the working fluid through each of the bypass air heat exchanger, the auxiliary heat exchanger and the fuel heat exchanger in a first flow direction and a second flow direction opposite to the first direction.

2. The thermal management system according to claim 1, wherein the first flow direction comprises flowing the working fluid from the bidirectional pump to the bypass air heat exchanger and then to the auxiliary heat exchanger and then to the fuel heat exchanger and return the working fluid from the fuel heat exchanger to the bidirectional pump in series.

3. The thermal management system according to claim 1, wherein the second flow direction comprises flowing the working fluid from the bidirectional pump to the fuel heat exchanger and then to the auxiliary heat exchanger and then to the bypass air heat exchanger and return the working fluid from the bypass air heat exchanger to the bidirectional pump in series.

4. The thermal management system according to claim 1, wherein the bypass air heat exchanger comprises a bypass air side and a working fluid side; the bypass air heat exchanger configured to transfer thermal energy between a bypass air and the working fluid.

5. The thermal management system according to claim 1, wherein the auxiliary heat exchanger comprises an auxiliary fluid side and a working fluid side, the auxiliary heat exchanger configured to transfer thermal energy between an auxiliary fluid and the working fluid.

6. The thermal management system according to claim 1, wherein the fuel heat exchanger comprises a fuel side and a working fluid side, the fuel heat exchanger configured to transfer thermal energy between a fuel and the working fluid.

7. The thermal management system according to claim 1, further comprising: a controller in operative communication with the bidirectional pump; wherein the controller is configured to operate the bidirectional pump in the first flow direction and the second flow direction responsive to a gas turbine engine operational condition and flight envelope.

8. A gas turbine engine having a thermal management system with a bidirectional pump, the gas turbine engine comprising:

bypass air duct configured to flow a bypass air;

a fuel system configured to supply a fuel to a combustor;

a lubrication oil system configured to supply lubrication oil to components in the gas turbine engine;

a compressor bleed air system configured to supply compressor bleed air to aircraft systems;

a working fluid fluidly coupled with the bidirectional pump;

a bypass air heat exchanger fluidly coupled with the bidirectional pump through the working fluid, wherein the bypass air heat exchanger includes the bypass air thermally coupled with the working fluid;

an auxiliary heat exchanger fluidly coupled with the bidirectional pump and the bypass air heat exchanger through the working fluid, wherein the auxiliary heat exchanger includes an auxiliary fluid thermally coupled with the working fluid; and a fuel heat exchanger fluidly coupled with the bidirectional pump and the auxiliary heat exchanger through the working fluid, wherein the fuel heat exchanger includes the fuel thermally coupled with the working fluid; wherein the bidirectional pump pumps the working fluid through each of the bypass air heat exchanger, the auxiliary heat exchanger and the fuel heat exchanger in a first flow direction and a second flow direction opposite to the first direction.

9. The gas turbine engine according to claim 8, wherein the first flow direction comprises flowing the working fluid from the bidirectional pump to the bypass air heat exchanger and then to the auxiliary heat exchanger and then to the fuel heat exchanger and return the working fluid from the fuel heat exchanger to the bidirectional pump in series.

10. The gas turbine engine according to claim 8, wherein the second flow direction comprises flowing the working fluid from the bidirectional pump to the fuel heat exchanger and then to the auxiliary heat exchanger and then to the bypass air heat exchanger and return the working fluid from the bypass air heat exchanger to the bidirectional pump in series.

11. The gas turbine engine according to claim 8, wherein the bypass air heat exchanger comprises a bypass air side and a working fluid side; the bypass air heat exchanger configured to transfer thermal energy between the bypass air and the working fluid.

12. The gas turbine engine according to claim 8, wherein the auxiliary heat exchanger comprises an auxiliary fluid side and a working fluid side, the auxiliary heat exchanger configured to transfer thermal energy between the auxiliary fluid and the working fluid.

13. The gas turbine engine according to claim 8, wherein the fuel heat exchanger comprises a fuel side and a working fluid side, the fuel heat exchanger configured to transfer thermal energy between the fuel and the working fluid.

14. A process for a thermal management system having a bidirectional pump in a gas turbine engine comprising:

configuring a bypass air duct to flow a bypass air; configuring a fuel system to supply a fuel to a combustor;

configuring a lubrication oil system to supply a lubrication oil to components in the gas turbine engine;

configuring a compressor bleed air system to supply compressor bleed air to aircraft systems;

fluidly coupling a working fluid with the bidirectional pump;

fluidly coupling a bypass air heat exchanger with the bidirectional pump through the working fluid; thermally coupling the bypass air with the working fluid;

fluidly coupling an auxiliary heat exchanger with the bidirectional pump and the bypass air heat exchanger through the working fluid;

thermally coupling an auxiliary fluid with the working fluid;

fluidly coupling a fuel heat exchanger with the bidirectional pump and the auxiliary heat exchanger through the working fluid, thermally coupling the fuel with the working fluid; and flowing via the bidirectional pump the working fluid through each of the bypass air heat exchanger, the auxiliary heat exchanger and the fuel heat exchanger in a first flow direction and a second flow direction opposite to the first direction.

15. The process of claim 14, further comprising:

flowing the working fluid from the bidirectional pump to the bypass air heat exchanger and then to the auxiliary heat exchanger and then to the fuel heat exchanger and return the working fluid from the fuel heat exchanger to the bidirectional pump in series, as the first flow direction.

16. The process of claim 14, further comprising:

flowing the working fluid from the bidirectional pump to the fuel heat exchanger and then to the auxiliary heat exchanger and then to the bypass air heat exchanger and return the working fluid from the bypass air heat exchanger to the bidirectional pump in series, as the second flow direction.

17. The process of claim 14, wherein the bypass air heat exchanger comprises a bypass air side and a working fluid side; and configuring the bypass air heat exchanger to transfer thermal energy between the bypass air and the working fluid.

18. The process of claim 14, wherein the auxiliary heat exchanger comprises an auxiliary fluid side and a working fluid side; and configuring the auxiliary heat exchanger to transfer thermal energy between the auxiliary fluid and the working fluid.

19. The process of claim 14, wherein the fuel heat exchanger comprises a fuel side and a working fluid side; and configuring the fuel heat exchanger to transfer thermal energy between the fuel and the working fluid.

20. The process of claim 14, further comprising:

coupling a controller in operative communication with the bidirectional pump; and configuring the controller to operate the bidirectional pump the first flow direction and the second flow direction responsive to a gas turbine engine operational condition and flight envelope.

\* \* \* \* \*